United States Patent
Tobinaga

(10) Patent No.: US 8,867,078 B2
(45) Date of Patent: Oct. 21, 2014

(54) OPERATION DEVICE AND OPERATION METHOD

(71) Applicant: KYOCERA Document Solutions Inc., Osaka (JP)

(72) Inventor: Masayuki Tobinaga, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 72 days.

(21) Appl. No.: 13/660,549

(22) Filed: Oct. 25, 2012

(65) Prior Publication Data

US 2013/0107321 A1    May 2, 2013

(30) Foreign Application Priority Data

Oct. 28, 2011 (JP) .................. 2011-237686

(51) Int. Cl.
- *H04N 1/32* (2006.01)
- *H04M 1/26* (2006.01)
- *G06F 7/58* (2006.01)

(52) U.S. Cl.
CPC ..................................... *G06F 7/582* (2013.01)
USPC ........................................ 358/1.15; 358/440

(58) Field of Classification Search
USPC ............ 358/1.15, 438, 405, 406, 426.12, 440
See application file for complete search history.

(56) References Cited

U.S. PATENT DOCUMENTS

| | | | | |
|---|---|---|---|---|
| 2002/0081994 A1* | 6/2002 | Aoyagi | ........................ | 455/411 |
| 2002/0126000 A1* | 9/2002 | Shintani et al. | .......... | 340/310.01 |
| 2003/0023862 A1* | 1/2003 | Yamasaki et al. | ............ | 713/194 |
| 2004/0096060 A1* | 5/2004 | Henry et al. | .................... | 380/46 |
| 2006/0095369 A1* | 5/2006 | Hofi | ................................ | 705/39 |
| 2007/0055863 A1* | 3/2007 | Araki et al. | ................... | 713/151 |
| 2009/0276621 A1* | 11/2009 | Matsuo | .......................... | 713/155 |
| 2012/0030467 A1* | 2/2012 | Schaefer | ....................... | 713/169 |
| 2013/0107321 A1* | 5/2013 | Tobinaga | .................... | 358/1.15 |

FOREIGN PATENT DOCUMENTS

| | | | | |
|---|---|---|---|---|
| JP | 7-154563 A | 6/1995 | | |
| JP | 2001-77997 A | 3/2001 | | |
| JP | 2007-36478 A | 2/2007 | | |
| JP | 2008-263377 A | 10/2008 | | |
| JP | 2008-288715 A | 11/2008 | | |
| JP | 2011003056 | * 1/2011 | ............... | G06F 3/12 |

* cited by examiner

*Primary Examiner* — Jerome Grant, II

(74) *Attorney, Agent, or Firm* — Knobbe, Martens Olson & Bear LLP

(57) ABSTRACT

Disclosed is an operation device which receives an input of an address twice in a row from a user, and determines the input of the address when a second address is identical to a first address, and the operation device includes a pseudo-address generator 402, a pseudo-address display unit 404, and an address determining unit 405. The pseudo-address generator 402 generates a pseudo-address obtained by converting a portion of characters included in the first address to predetermined characters when the first address is input. The pseudo-address display unit 404 displays a key of the first address and a key of the pseudo-address to be pressed by the user. The address determining unit 405 sets a predetermined address of a pressed key to a second address when the key of the predetermined address is pressed, and determines whether the second address is identical to the first address.

9 Claims, 8 Drawing Sheets

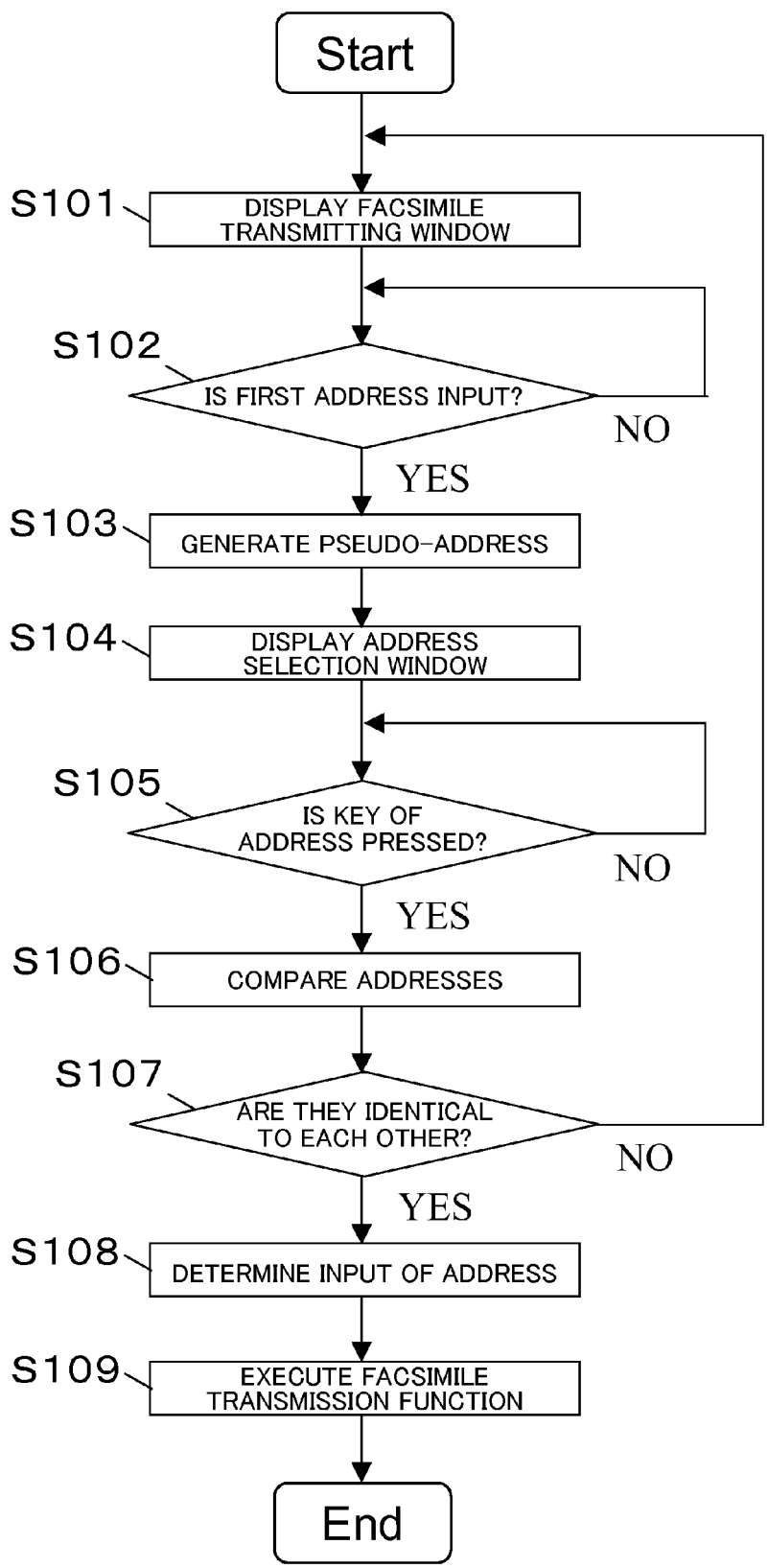

OPERATION DEVICE AND OPERATION METHOD

REFERENCE TO RELATED APPLICATIONS

This application is based upon and claims the benefit of priority from the corresponding Japanese Patent Application No. 2011-237686, filed in the Japan Patent Office on Oct. 28, 2011, the entire contents of which are incorporated herein by reference.

BACKGROUND

The present disclosure relates to an operation device and an operation method, and more particularly, relates to an operation device and an operation method capable of easily inputting an address when the same address is input twice, and preventing an input mistake of the address.

In a conventional facsimile apparatus, a call request to the other party has been performed by a one-touch dial, an abbreviated dialing, or a number key dial.

For example, when a user intends to perform a call request to the other party of a one-touch dial 01, and presses the one-touch dial 01, a facsimile number associated with the one-touch dial 01 is automatically input, and predetermined transmission information is transmitted to the other party of the facsimile number.

However, here, when the user erroneously presses a neighboring one-touch dial (for example, a one-touch dial 02), there is a problem in that the transmission information is transmitted to the other party of the one-touch dial 02, and erroneous communication may be performed.

As a technology for resolving the above problem, there is a known facsimile apparatus which includes a unit inputting the other party to perform a call request a plurality of times using the same method or different methods, performing a call request operation only when a plurality of input the other party information items match each other, while displaying the corresponding information and not performing a call request when the plurality of the other party information items do not match each other. In this way, it is regarded as possible to effectively prevent erroneous communication performed due to an erroneous address input operation.

Further, there is a known facsimile apparatus which includes the other party information saving unit that saves the other party information for each of the other party phone number, and the other party information display unit that displays the other party phone number input by a user during a manual dialing and the other party information saved by the other party information saving unit corresponding to the other party phone number. In this way, it is regarded as possible to verify whether an input phone number is intended by a user, and prevent an erroneous input of a phone number.

Further, there is a known data transmission method which includes a registration step of registering address information together with abbreviated information having smaller number of words than that of the address information, and a transmission instruction step of performing a transmission instruction by inputting the abbreviated information and address information corresponding to the abbreviated information. The data transmission method further includes a transmission step of transmitting transmission data to an address specified by matching address information when the address information registered in response to the abbreviated information input in the transmission instruction step matches the address information input in the transmission instruction step. In this way, it is regarded as possible to prevent an erroneous transmission of data without greatly burdening a user.

Further, there is a known information communication apparatus which includes a transmission and reception unit that transmits and receives an e-mail via a network, a mail data processing unit that constructs data of a transmitted e-mail and analyzes data of a received e-mail, an operation unit that enables information exchange with a user and receives an input of a transmission request of an e-mail, and a system control unit that transmits and receives an e-mail by operating the transmission and reception unit and the mail data processing unit in response to the transmission request performed through the operation unit. The system control unit of the information communication apparatus includes a management information acquisition unit that requests an acquisition of management information associated with a domain of a mail address of a transmission destination instructed in a transmission request of an e-mail performed through the operation unit with respect to a whois server via a network, and receives the management information sent from the whois server. Further, the system control unit includes a management information notification unit that notifies management information, associated with the domain acquired by the management information acquisition unit, by using the operation unit, and a transmission destination verification unit that verifies a transmission destination by an input operation received in the operation unit after the notification of the management information associated with the domain. In this way, it is regarded as possible to easily verify whether a transmission destination is an intended transmission destination based on the management information, and reliably prevent an erroneous transmission.

Further, there is a known relaying apparatus which relays a communication apparatus and a public network performing mediation of the communication apparatus and the other party device. The communication apparatus may connect, via a public network, an input unit which inputs a phone number with the other party device corresponding to the phone number. The communication apparatus accesses the public network by transmitting an off hook signal, receives a dial tone transmitted from the public network, and transmits a phone number input from the input unit, and may transmit image and sound data. Further, the communication apparatus is called and connected from the other party device via the public network, and may receive image and sound data. Then, the relaying apparatus includes an incoming determining unit that determines an incoming of a call, a call unit that receives a call request from a relay source, a call request unit that performs a call request to a relay destination, and a pseudo-tone transmission unit that selects one of a pseudo-dial tone and a pseudo-busy tone and transmits the selected one. Further, the relaying apparatus includes a phone number determining unit that divides a received phone number in the middle and determines whether the received phone number is valid when arrangements of digits of the divided phone number match each other, a control unit that controls an operation of an apparatus, and a storage unit that temporarily stores data associated with the operation of the apparatus. Furthermore, the relaying apparatus relays the communication apparatus and the public network, receives an off hook signal, transmitted from the communication apparatus to the public network, by the call unit when performing a call request to the other party device by using the communication apparatus, and transmits a pseudo-dial tone to the communication apparatus by using a pseudo-tone transmission unit. Further, the relaying apparatus subsequently receives a phone number transmitted from the communication apparatus, stores the phone number using the storage unit, and determines validity of the phone number received by the phone number determining unit. Then, when the phone number is determined to be valid in the relaying apparatus, the call request unit performs a call request of one of the divided phone numbers to the public network, and the relaying apparatus connects the communication apparatus with the public network, and relays a ringing back tone from the public network to the communication apparatus. On the other hand, when the phone number is determined to be erroneous, the relaying apparatus does not perform connection to the public network. In this way, in a case where a phone number input by a call device is erroneous, the relaying apparatus does not perform a call request to the public network, and thus it is possible to prevent image and sound data from being erroneously transmitted to the other party even when a user performs an erroneous input.

Here, besides the five technologies above, as a conventional technology for preventing an input mistake of an address, there is a technology which causes a user to input an address configured by characters of a phone number, a facsimile number, an e-mail address, a folder, an FTP (file transfer protocol) path name, and the like twice in a row, and performs a process corresponding to the address only when a second input address matches a first input address.

In the technology, it is effective in that the user verifies validity of an input address when performing an input twice. However, there is a problem in that inputting an address twice is a nuisance for a user, and takes time. The problem may not be resolved by the five technologies.

SUMMARY

Disclosed is an operation device which receives an input of an address twice in a row from a user, and determines the input of the address when a second address is identical to a first address, and the operation device includes a pseudo-address generator, a pseudo-address display unit, and an address determining unit.

The pseudo-address generator generates a pseudo-address obtained by converting a portion of characters included in the first address to predetermined characters when the first address is input. The pseudo-address display unit displays a key of the first address and a key of the pseudo-address to be pressed by the user. The address determining unit sets a predetermined address of a pressed key to a second address when the key of the predetermined address is pressed, and determines whether the second address is identical to the first address.

In addition, disclosed is an operation method of an operation device which receives an input of an address twice in a row from a user, and determines the input of the address when a second address is identical to a first address.

That is, the operation method includes a pseudo-address generating step, a pseudo-address displaying step, an address determining step. The pseudo-address generating step generates a pseudo-address obtained by converting a portion of characters included in the first address to predetermined characters when the first address is input. The pseudo-address displaying step displays a key of the first address and a key of the pseudo-address to be pressed by the user. The address determining step sets a predetermined address of a pressed key to a second address when the key of the predetermined address is pressed, and determines whether the second address is identical to the first address.

Further, the disclosure may be provided as a program, to be executed by a computer, which is individually distributed through an electric telecommunication line. In this case, a central processing unit (CPU) implements a control operation by cooperating with each circuit other than the CPU according to the program of the disclosure. Further, each unit implemented using the program and the CPU may be configured using dedicated hardware. Further, the program may be distributed by being recorded in a computer readable recording medium such as a CD-ROM.

BRIEF DESCRIPTION OF DRAWINGS

FIG. 5 is a first flowchart showing an execution procedure of an embodiment of the disclosure;

DETAILED DESCRIPTION

An embodiment of an image forming apparatus provided with an operation device of the disclosure is described hereinafter with reference to the accompanying drawings. It should be noted that the following embodiments are mere examples of implementation of the disclosure, and in no way restrict the technical scope of the disclosure. As used herein, an alphabetical letter "S" prefixed to a number in the flowcharts represents a step.

Image Forming Apparatus and Operation Device

An image forming apparatus provided with an operation device according to an embodiment of the disclosure is described hereinafter.

Figure 1:
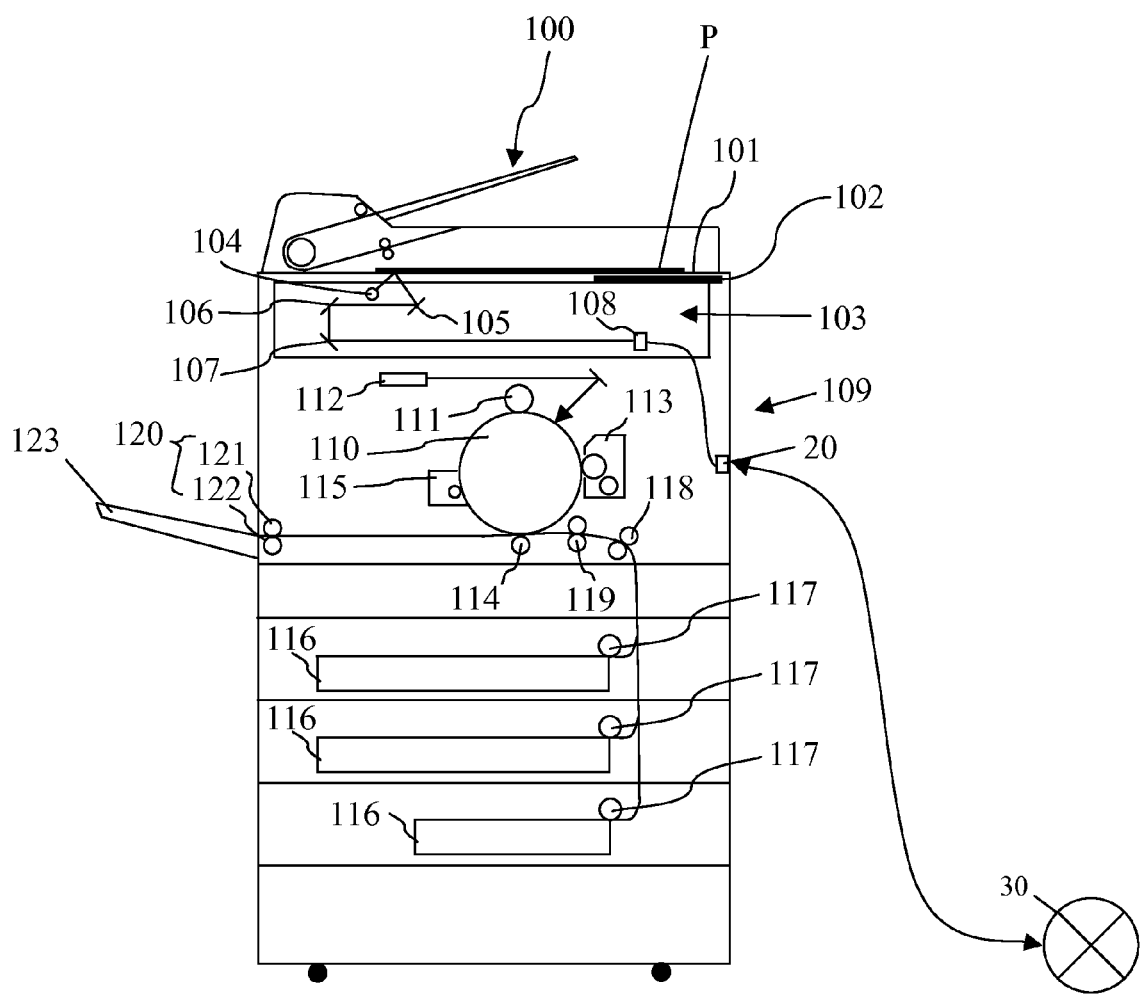
FIG. 1 is a schematic view illustrating an entire internal configuration of a multifunction peripheral according to the disclosure.

FIG. 1 is a schematic view illustrating an image forming apparatus according to an embodiment of the disclosure. However, the details of each component not directly related to the disclosure are not provided. The image forming apparatus of the disclosure is, for example, a printer or a scanner unit, or a multifunction peripheral or the like including a printer, a copying machine, a scanner, a FAX or the like, which functions as an image forming apparatus including a copy function, a scanner function, a facsimile function, a printer function, and the like. As an example, an operation of a multifunction peripheral (MFP) 100 in a case of using a copy function is briefly described hereinafter.

In a case where a user uses the multifunction peripheral 100, a user places an original P on a platen 101 disposed on an upper face of the multifunction peripheral 100, and inputs setting for the copy function via an operation unit 102. In operation unit 102, an operation window (initial window and the like) related to the copy function provided by the multifunction peripheral 100 is displayed, and a plurality of setting item keys related to the copy function are selectably displayed. In addition, in the operation window, a function item key is selectably displayed in a tab format for each function. The user inputs setting conditions regarding the copy function through the operation window.

When the input of the setting conditions is completed, the user presses a start key 205 provided in the operation unit 102 to cause the multifunction peripheral 100 to initiate a process of the copy function.

When the multifunction peripheral 100 initiates the process of the copy function, light radiated from a light source 104 in the image reading unit 103 is reflected on the original placed on the platen 101. The reflected light is guided by mirrors 105, 106, and 107 to an imaging device 108. The imaging device 108 performs photoelectric conversion of the light thus guided, and fundamental correction processing, image quality processing, compression processing, and the like are performed. Thus, image data corresponding to the original is generated.

The generated image data is transmitted to a communication unit 20 connected to the imaging device 108 according to an instruction of the operation unit 102. Using the image data and an address (for example, a facsimile number, an e-mail address) input from the operation unit 102, the communication unit 20 transmits the image data to the address through a network 30.

An image forming unit 109 is a driving unit that transfers the image data as a toner image. A photoreceptor drum 110 is provided in the image forming unit 109. The photoreceptor drum 110 rotates in a predetermined direction at a constant speed. In the periphery of the photoreceptor drum 110, a charging device 111, an exposure unit 112, a developing device 113, a transfer device 114, a cleaning unit 115, and the like are disposed, in this order from an upstream side in a rotational direction.

The charging unit 111 uniformly charges a surface of the photoreceptor drum 110. The exposure unit 112 irradiates a surface of the photoreceptor drum 110 thus charged with laser based on the image data, thereby forming an electrostatic latent image. The developing device 113 deposits toner on the electrostatic latent image being fed, thereby forming a toner image. The transfer device 114 transfers the formed toner image to a recording medium (for example, a sheet). The cleaning unit 115 removes excessive toner remaining on the surface of the photoreceptor drum 110. This series of processes is performed by rotation of the photoreceptor drum 110.

The sheet is fed from a plurality of paper feeding cassettes 116 provided in the multifunction peripheral 100. The sheet to be fed is pulled out from any one of the paper feeding cassettes 116 to a paper path by a pickup roller 117. In each of the paper feeding cassettes 116, sheets of different types are stored. The sheets are fed based on setting regarding the output conditions.

The sheet being pulled out to the paper path is fed into between the photoreceptor drum 110 and the transfer device 114 by a feeding roller 118 and a resist roller 119. The sheet thus fed is, after transfer of the toner image thereto by the transfer device 114, further fed to a fusing device 120.

When the sheet to which the toner image is transferred passes between a heating roller 121 and a pressurizing roller 122 provided in the fusing device 120, heat and pressure are applied to the toner image, thereby fusing a visible image onto the sheet. Heat quantity of the heating roller 121 is optimized according to types of sheets. As such, the fusing is properly performed. The image formation is completed with fusing of the visible image onto the sheet. The sheet onto which the visible image is fused is fed to an ejected paper tray 123 via the fusing device 120, loaded, and received.

By the above-described steps, the multifunction peripheral 100 provides the copy function to a user.

A function of transmitting a predetermined image data to a predetermined address, for example, a facsimile transmitting function or an e-mail transmitting function is provided to a user by the above-described communication unit 20.

Figure 2:
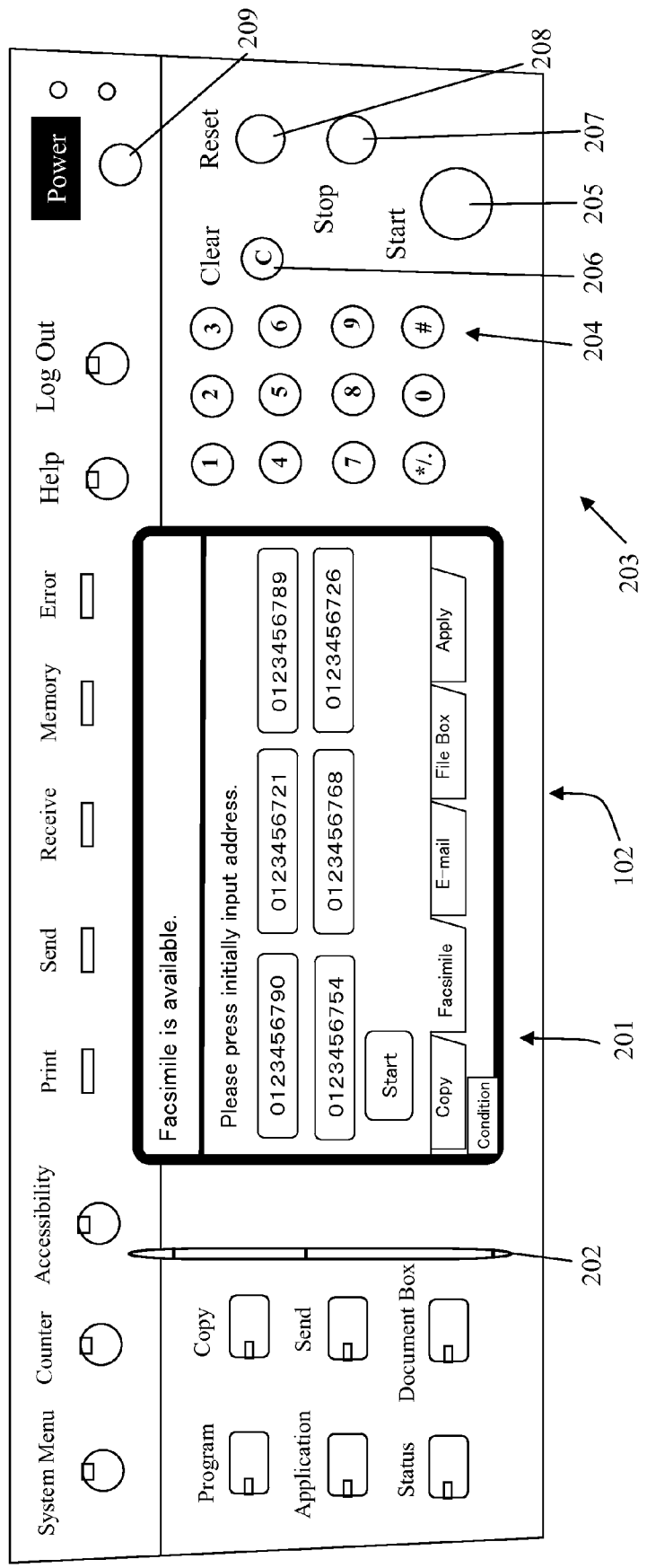
FIG. 2 is a schematic view illustrating the overall configuration of an operation unit according to the disclosure.

FIG. 2 is a schematic view illustrating the overall configuration of an operation unit according to an embodiment of the disclosure. A user inputs setting conditions and verifies the setting conditions being input in relation to image formation as described above by use of the operation unit 102. When the setting conditions are input, a touch panel 201 (operation panel) provided in the operation unit 102, a stylus pen 202, and an operation key 203 are used.

The touch panel 201 includes both a function of inputting setting conditions and a function of displaying the setting conditions. That is, by pressing an item key within a window displayed on the touch panel 201, a setting condition corresponding to the pressed item key is input.

On the back side of the touch panel 201, a display unit (not illustrated) such as an LCD (liquid crystal display) is provided. The display unit displays, for example, an operation window such as the initial window. The stylus pen 202 is provided near the touch panel 201. When a user brings the tip of the stylus pen 202 into contact with the touch panel 201, a sensor provided under the touch panel 201 detects the contact position.

Furthermore, a predetermined number of operation keys 203 are provided near the touch panel 201. For example, number keys 204, a start key 205, a clear key 206, a stop key 207, a reset key 208, and a power key 209 are provided.

Figure 3:
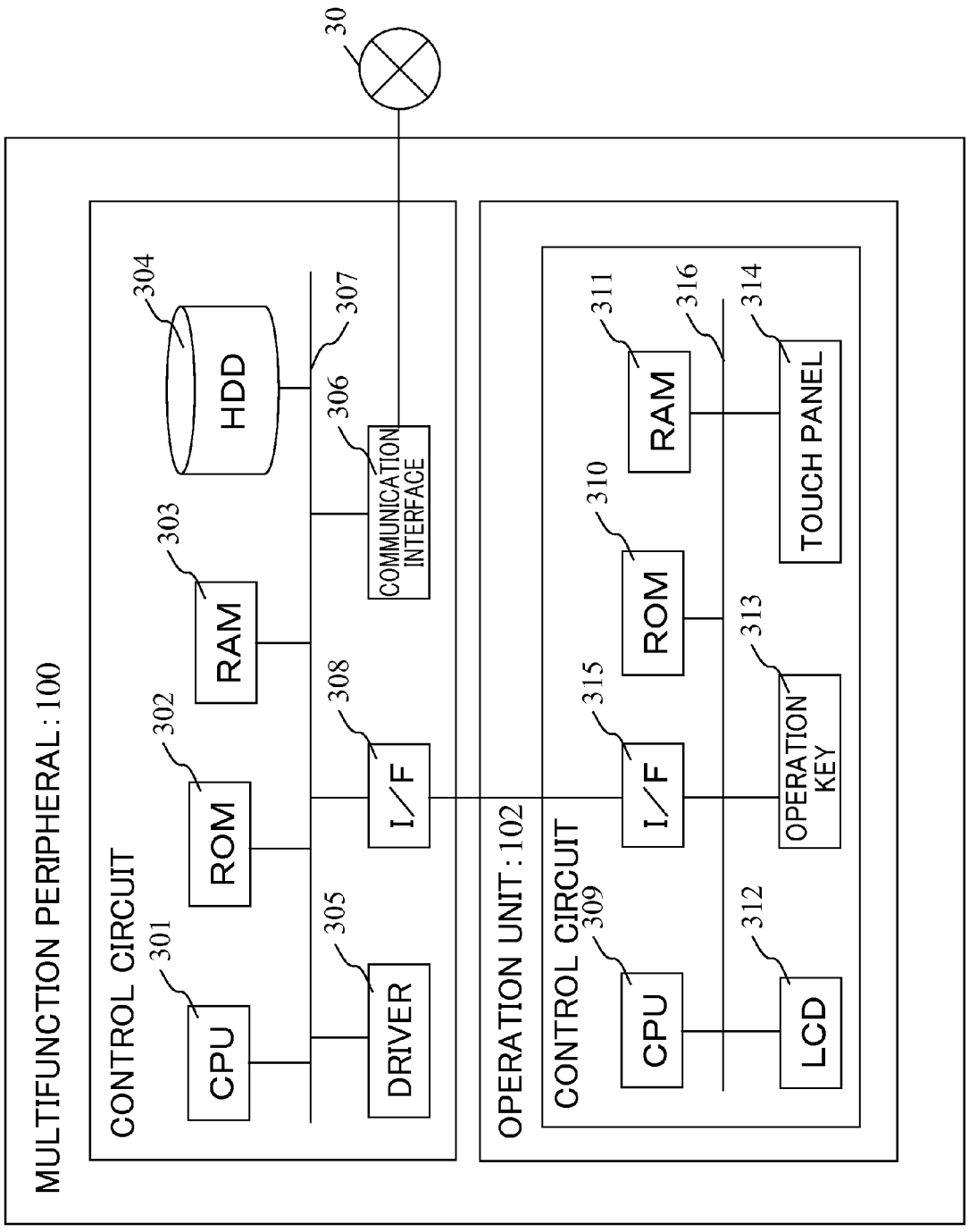
FIG. 3 is a diagram illustrating a hardware configuration of a control system of the multifunction peripheral and the operation unit according to the disclosure.

Next, a hardware configuration of a control system of the multifunction peripheral 100 and the operation unit 102 is described with reference to FIG. 3. FIG. 3 is a diagram illustrating a hardware configuration of a control system of the multifunction peripheral 100 and the operation unit 102 according to the disclosure. However, the details of each component not directly related to the disclosure are not provided.

A control circuit of the multifunction peripheral 100 is configured from a CPU (central processing unit) 301, a ROM (read only memory) 302, a RAM (random access memory) 303, a HDD (hard disk drive) 304, drivers 305 respectively corresponding to the driving units, and a communication interface 306 connected by an internal bus 307. The CPU 301, for example, uses the RAM 303 as a work area, and executes programs that are stored in the ROM 302, the HDD 304, and the like. The CPU 301 exchanges data or instructions from the operation unit 102 or the driver 305 based on the results of execution, and controls an operation of each driving unit illustrated in FIG. 1. Further, the CPU 301 specifies a terminal device (for example, a PC or a multifunction peripheral) of an address on a network 30 via the communication interface 306 based on data of the address input from the operation unit 102, and transmits predetermined data (image data and the like).

Each unit (illustrated in FIG. 4) described below other than the drive units is realized by execution of programs by the CPU 301.

Further, an internal interface 308 is connected to the internal bus 307 of the control circuit. The internal interface 308 connects a control circuit and the like of the operation unit 102 with a control circuit of the multifunction peripheral 100.

Furthermore, the control circuit of the operation unit 102 is configured from a CPU 309, a ROM 310, a RAM 311, an LCD 312, an operation key 313 (203), a touch panel 314 (201), and an internal interface 315 connected by an internal bus 316. When a user operates the operation key 313 or the touch panel 314, the CPU 309 transmits an instruction signal based on the operation to the control circuit of the multifunction peripheral 100 via the internal interface 315. The functions of the CPU 309, the ROM 310, and the RAM 311 are the same as the above. Each unit described below (illustrated in FIG. 4) is realized by execution of programs by the CPU 309. The programs or data for realizing each unit described below are stored in the ROM 310.

Embodiments of the Disclosure

Figure 4:
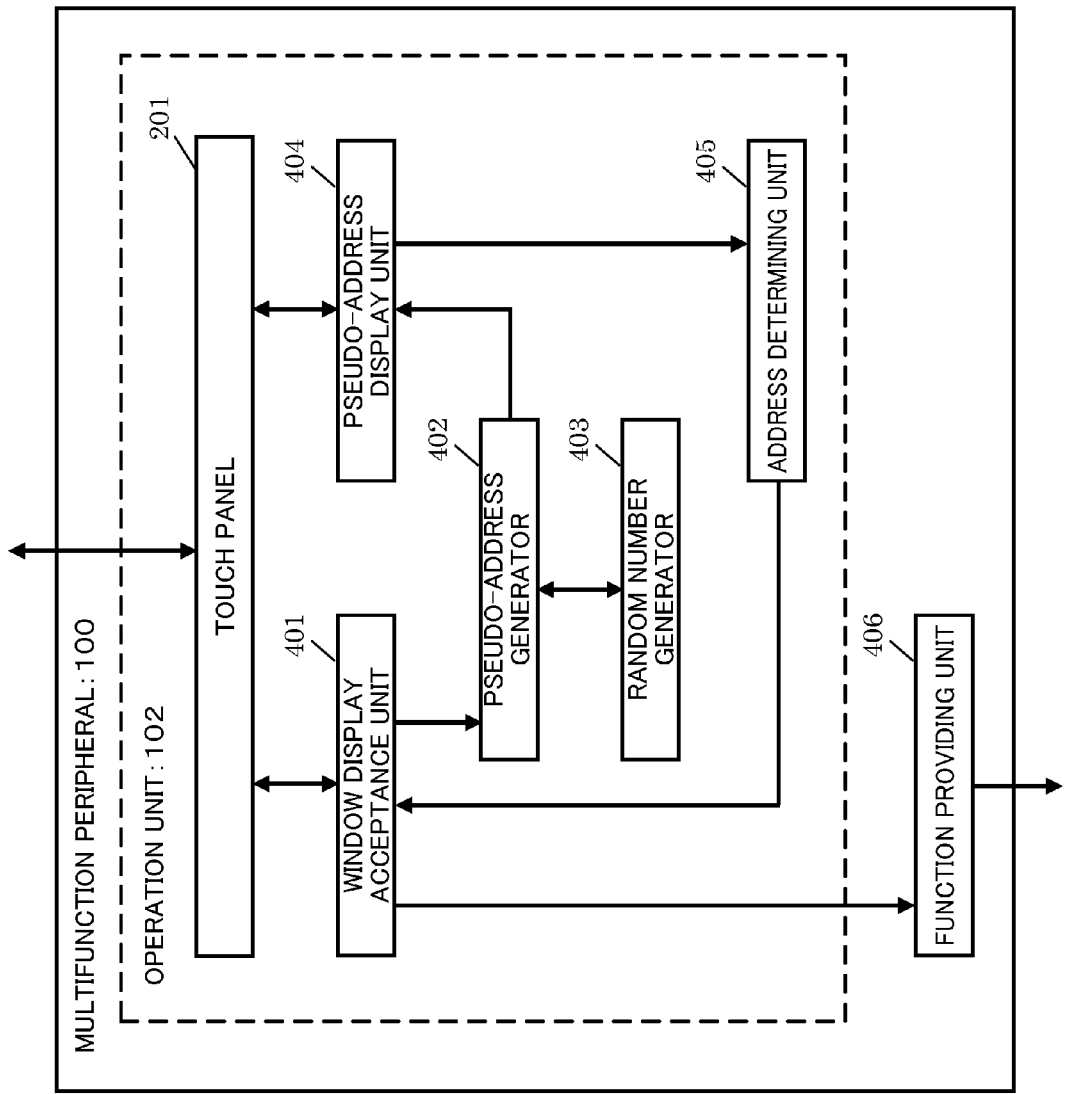
FIG. 4 is a functional block diagram of the multifunction peripheral and the operation unit according to an embodiment of the disclosure.

Next, a configuration and execution procedure according to an embodiment of the disclosure will be described with reference to FIGS. 4 and 5. FIG. 4 is a functional block diagram of the multifunction peripheral and the operation unit of the disclosure. FIG. 5 is a flowchart showing an execution procedure of the disclosure.

First, a user places a predetermined original on the platen 101 of the multifunction peripheral 100, and turns on the multifunction peripheral 100. Then, the multifunction peripheral 100 and the operation unit 102 are activated, and a window display acceptance unit 401 of the activated operation unit 102 displays a predetermined initial window for inputting setting conditions of a predetermined function (for example, a copy function) on the touch panel 201.

The user, for example, presses a tab key of a facsimile transmitting function displayed on the initial window to use the facsimile transmitting function while viewing the initial window. Then, the window display acceptance unit 401 receives the press of the tab key of the facsimile transmitting function, switches a window from the initial window to a facsimile transmitting window corresponding to the facsimile transmitting function, and displays the facsimile transmitting window (S101 in FIG. 5).

Figure 6A:
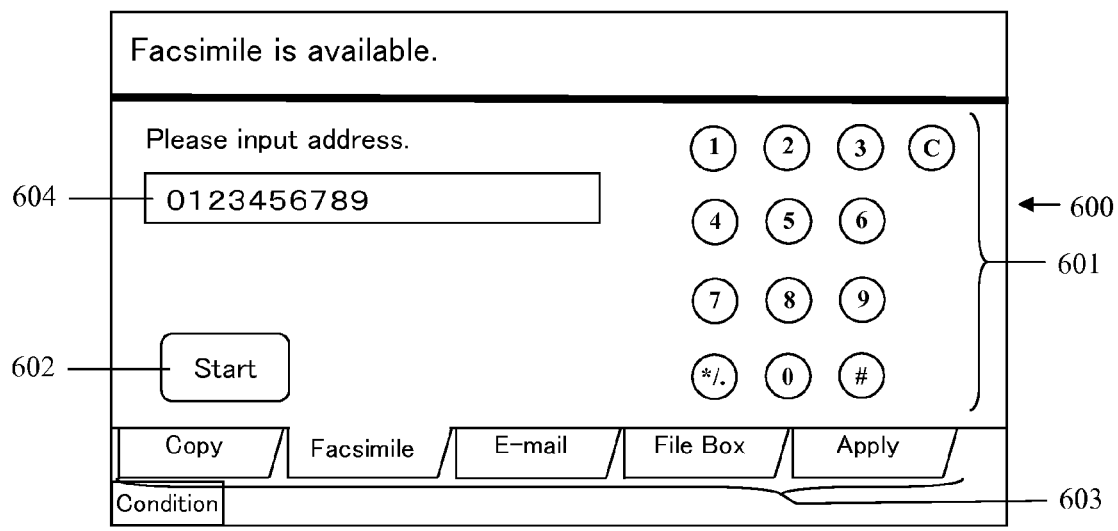
FIG. 6A is a diagram illustrating an example of a facsimile transmitting window displayed on a touch panel of the embodiment of the disclosure.

As illustrated in FIG. 6A, number keys 601 for inputting a digit of a facsimile number of the address, a start key 602 for verifying an input of the address and initiating execution of the facsimile transmitting function, and a tab key 603 for another function are displayed to be pressed on the facsimile transmitting window 600. Further, a digit input by the number keys 601 is displayed as a facsimile number of the address on an address input box 604.

Here, the user inputs a facsimile number of a predetermined address (for example, "0123456789") to the address input box 604 by using the number keys 601, and presses the start key 602 (S102 in FIG. 5). Next, the window display acceptance unit 401 receives the press of the start key 602, temporarily stores the facsimile number of the address ("0123456789") in a predetermined memory, and notifies the information to a pseudo-address generator 402. The pseudo-address generator 402 receiving the notification receives the previously stored facsimile number of the address as initially received facsimile number of the first address, and generates a facsimile number of a pseudo-address obtained by converting a portion of digits included in the facsimile number of the first address to predetermined digits (S103 in FIG. 5).

Figure 6B:
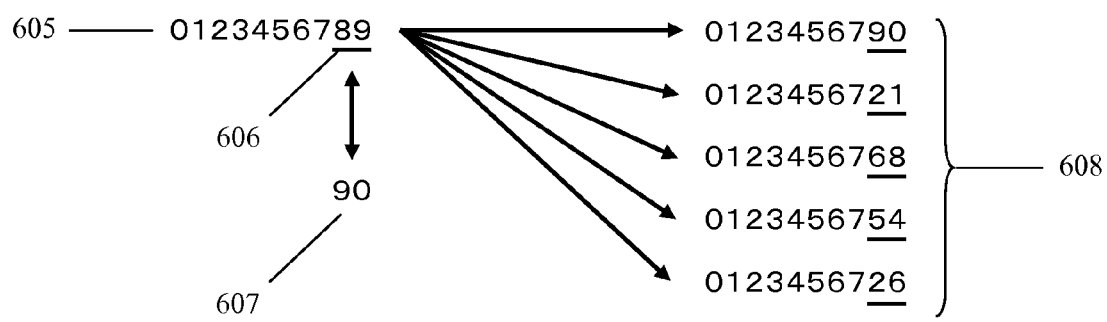
FIG. 6B is a diagram illustrating an example of a case of generating a facsimile number of a pseudo-address according to the embodiment of the disclosure.

Specifically, as illustrated in FIG. 6B, the pseudo-address generator 402 copies the facsimile number of the first address, and determines, as the portion, the last two digits 606 (for example, "89") among ten digits included in the copied facsimile number 605 of the first address. Next, using a random number generator 403, the pseudo-address generator 402 randomly generates two digits 607 (for example, "90") in response to the two digits 606 (for example, "89") included in the portion. Then, the pseudo-address generator 402 compares the generated two digits 607 (for example, "90") with the two digits 606 (for example, "89") included in the portion for each digit, and determines whether they are identical to each other.

When they are identical to each other as a result of the determination, the pseudo-address generator 402 eliminates the previously generated two digits 607, generates two new digits using the random number generator 403, and compares the two new digits with the two digits 606 included in the portion. In this way, it is possible to prevent a facsimile number of a pseudo-address identical to the facsimile number of the first address from being generated.

On the other hand, when they are not identical to each other as a result of the determination, the pseudo-address generator 402 converts (changes) the two digits 606 ("89") included in the portion among the previously copied facsimile number 605 of the first address to the generated two digits 607 ("90"). Facsimile number 608 after the conversion is generated as a facsimile number of the pseudo-address.

In this way, it is possible to generate a facsimile number of the pseudo-address not identical to the facsimile number of the first address at first appearance. Here, the facsimile number of the pseudo-address is different from a portion of the entire facsimile number of the first address, and the other portion is identically constructed facsimile number of the address, and thus is close (similar) to the facsimile number of the first address.

When the address is a facsimile number (or a phone number), digits from a first digit to a predetermined number of digits (for example, in a case of Osaka, first two digits are "06") corresponding to a predetermined area are determined in advance. For this reason, in a case in which the address is a facsimile number (or a phone number), when the pseudo-address generator 402 determines digits from a last first digit to a predetermined number of digits (for example, last two digits) as a portion of digits included in the facsimile number of the first address, generated facsimile number of a pseudo-address is further close to the facsimile number of the first address, which is confusing.

Further, when the pseudo-address generator 402 generates the facsimile number 608 of a plurality of pseudo-addresses, the pseudo-address generator 402 compares a portion which is a conversion target of the previously generated facsimile number 608 of the pseudo-address with a portion of the generated facsimile number 608 of the pseudo-address each time the facsimile number 608 of a pseudo-address is generated. The pseudo-address generator 402 eliminates the previously generated facsimile number 608 of the pseudo-address when they are identical to each other, and maintains the previously generated facsimile number 608 of the pseudo-address when they are not identical to each other. In this way, it is possible to prevent the facsimile number 608 of the pseudo-address from being redundantly generated.

When the pseudo-address generator 402 generates a predetermined number of (for example, five) facsimile numbers 608 of the pseudo-address by repeatedly performing the above method, the pseudo-address generator 402 notifies the information to a pseudo-address display unit 404. The pseudo-address display unit 404 receiving the notification acquires the facsimile number of the first address and the facsimile number of the pseudo-address from the pseudo-address generator 402. In addition, the pseudo-address display unit 404 displays an address selection window that displays a key of the facsimile number of the first address acquired from the facsimile transmitting window 600, and a key of the acquired facsimile number of the pseudo-address to be pressed on the touch panel 201 (S104 in FIG. 5).

Figure 7A:
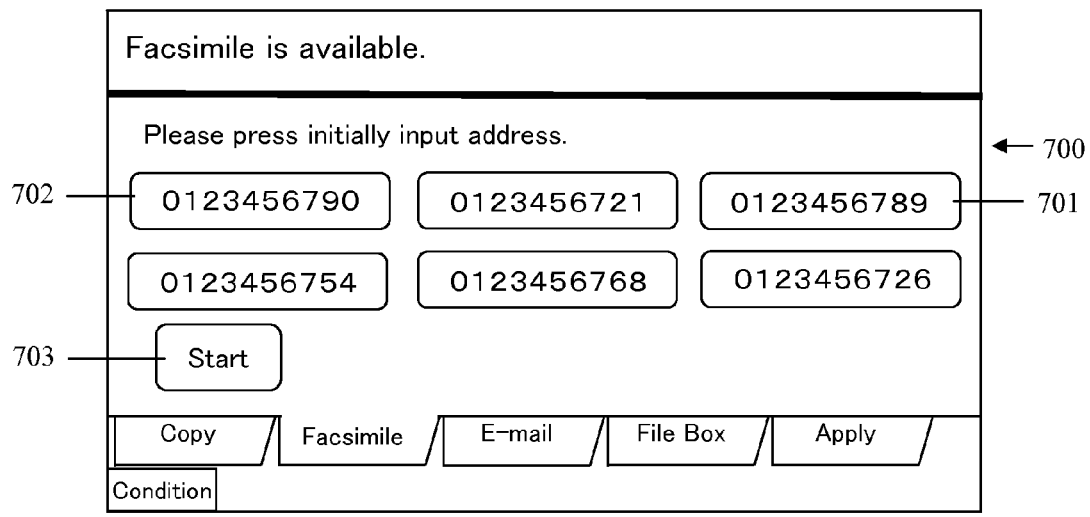
FIG. 7A is a diagram illustrating an example of an address selection window displayed on a touch panel according to the embodiment of the disclosure.

As illustrated in FIG. 7A, a key 701 of the facsimile number of the first address ("0123456789"), a key 702 of a predetermined number of (five) facsimile numbers of the pseudo-address ("0123456790" and the like), and the start key 703 are displayed to be pressed on the address selection window 700.

In this way, the user may find out the key 701 of the facsimile number of the first address from the keys 701 and 702, and thus an operation of inputting the facsimile number of the first address again may not be performed. Further, since the key 702 of the facsimile number of the pseudo-address is displayed in addition to the key 701 of the facsimile number of the first address, the user attentively confirms a facsimile number of an address of each of the keys 701 and 702. That is, on this occasion, the user sufficiently verifies whether the facsimile number of the first address is correct. For this reason, the user may not bother about an operation of inputting a facsimile number of a second address, and sufficiently verify whether a facsimile number of an address input by the user is correct.

Here, when displaying the keys 701 and 702 to be pressed, the pseudo-address display unit 404 may use any arrangement. For example, as illustrated in FIG. 7A, the key 701 of the acquired facsimile number of the first address and the key 702 of the acquired facsimile number of the pseudo-address are randomly displayed in an arrangement of two rows and three columns. In this way, the user needs to sufficiently verify which one of the keys 701 and 702 is the facsimile number of the first address when pressing the keys 701 and 702, and thus an input mistake may be prevented to a maximum extent.

While viewing the address selection window 700, the user presses a key of a facsimile number of a predetermined address considered to be the facsimile number of the first address (for example, "0123456790"), and presses the start key 703 (Yes in S105 of FIG. 5). Then, in response to the press of the start key 703, the pseudo-address generator 402 notifies the facsimile number of the address of the pressed key to an address determining unit 405. The address determining unit 405 receiving the notification receives the facsimile number of the address of the pressed key ("0123456790") as a facsimile number of a second address, and acquires the facsimile number of the first address ("0123456789") from the window display acceptance unit 401. The address determining unit 405 compares the facsimile number of the second address with the facsimile number of the first address (S106 of FIG. 5). In addition, the address determining unit 405 determines whether the facsimile number of the second address ("01236456790") is identical to the facsimile number of the first address ("0123456789") (S107 of FIG. 5).

Specifically, the address determining unit 405 compares all digits included in the facsimile number of the second address with all digits included in the facsimile number of the first address one by one from the first digit to the last digit. The address determining unit 405 determines that the facsimile numbers are identical to each other when all digits of a facsimile number are identical to all digits of another facsimile number, and determines that the facsimile numbers are not identical to each other when at least one digit of a facsimile number is not identical to at least one digit of another facsimile number.

When the facsimile number of the second address is not identical to the facsimile number of the first address as a result of the determination (No in S507 of FIG. 5), the address determining unit 405 notifies the information to the window display acceptance unit 401. The window display acceptance unit 401 receiving the notification eliminates the facsimile number of the first address ("0123456789") temporarily stored in the memory. Returning to S101, the window display acceptance unit 401 receiving the notification switches a displayed window from the address selection window to the facsimile transmitting window (S101 of FIG. 5). In this way, the address determining unit 405 notifies the user that a new facsimile number of a first address is to be input again. A type of notification is not limited to a display, and for example, sound, emission of light, vibration, and the like may be used.

As such, it is possible to prevent the facsimile transmitting function from being executed based on an address of a facsimile number input by mistake, and cause the user to input a facsimile number of a proper address again.

The above case corresponds to, for example, a case in which the facsimile number of the first address is erroneously input by a user, and a key of the facsimile number of the second address is properly pressed by the user.

On the other hand, when the facsimile number of the second address is identical to the facsimile number of the first address as a result of the determination (Yes in S107 of FIG. 5), the address determining unit 405 notifies the information to the window display acceptance unit 401. The window display acceptance unit 401 receiving the notification determines an input of the facsimile number of the first address temporarily stored in the memory (S108 of FIG. 5). Then, the window display acceptance unit 401 notifies the information to a function providing unit 406. The function providing unit 406 receiving the notification executes the facsimile transmitting function using the determined facsimile number of the address (S109 of FIG. 5).

Specifically, the function providing unit 406 acquires image data from the original placed on the platen 101, and transmits the acquired image data to an address of the determined facsimile number ("0123456789").

As such, the facsimile transmitting function is executed after the facsimile number of the address is attentively confirmed by the user. For this reason, it is possible to prevent predetermined image data from erroneously transmitted to an address of an erroneously input facsimile number as possible.

In this way, the operation unit 102 of the disclosure includes the pseudo-address generator 402 that generates a facsimile number of a pseudo-address obtained by converting a portion of digits included in a facsimile number of the first address to predetermined digits when the facsimile number of the first address is input, and the pseudo-address display unit 404 that displays a key of the facsimile number of the first address and a key of the facsimile number of the pseudo-address to be pressed by a user when the facsimile number of the second address is input. Further, the operation unit 102 further includes the address determining unit 405 that sets a facsimile number of an address of the pressed key to a facsimile number of a second address when the key of the facsimile number of the predetermined address is pressed, and determines whether the facsimile number of the second address is identical to the facsimile number of the first address.

In this way, without inputting the facsimile number of the second address, the user may find out and press the key 701 of the facsimile number of the first address from the key 702 of the facsimile number of the pseudo-address and the key 701 of the facsimile number of the first address. For this reason, it is possible to allow the user to skip an operation of inputting the facsimile number of the second address, and to sufficiently verify whether the facsimile number of the first address is correct by causing the user to sufficiently examine the facsimile number of the first address and the facsimile number of the pseudo-address. As a result, it is possible to prevent an input mistake of a facsimile number of an address.

In the embodiment of the disclosure, an address is a facsimile number configured by digits. However, the disclosure is not limited thereto. An address may have another configuration, for example, an e-mail address, a file pathname or a pathname of an FTP configured by alphameric characters or alphabetical characters may be used.

Figure 7B:
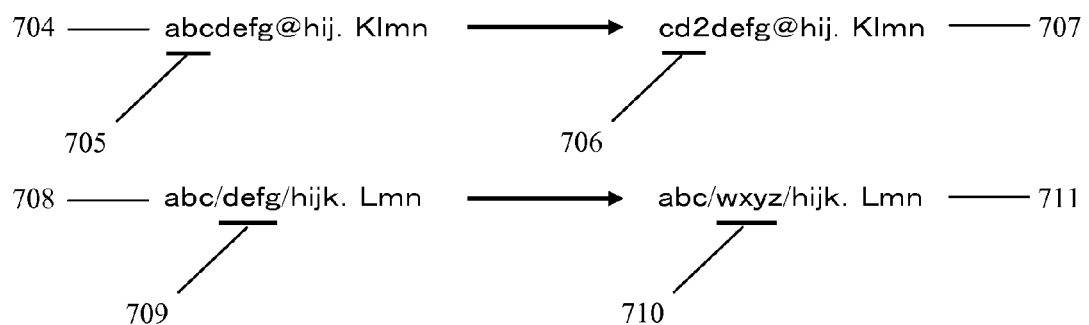
FIG. 7B is a diagram illustrating an example of a case of generating an e-mail address and a file pathname of a pseudo-address according to the embodiment of the disclosure.

For example, as illustrated in FIG. 7B, when the address is an e-mail address, the pseudo-address generator 402 determines, as the portion, a portion other than a domain name which specifies a mail server among alphameric characters included in an e-mail address 704 of a first address. The portion other than a domain name is, for example, three alphameric characters 705 ("abc"), from a first alphameric character to a third alphameric character, corresponding to alphameric characters prior to a specific character (at mark "@"). The pseudo-address generator 402 randomly generates three alphameric characters 706 ("cd2") in response to the portion 705 by using a predetermined alphameric character generator that randomly generates an alphameric character. A process of comparing and determining the three generated alphameric characters and the three alphameric characters included in the portion is similar to the above. In this way, the pseudo-address generator 402 may generate an e-mail address 707 of a pseudo-address.

Further, for example, as illustrated in FIG. 7B, when the address (corresponding to a destination to save) is a file pathname, the pseudo-address generator 402 determines, as the portion, a portion corresponding to a predetermined file name among alphabetical characters included in a file pathname 708 of a first address. The portion corresponding to a predetermined file name is, for example, a predetermined number of alphabetical characters 709 (for example "defg") included between predetermined characters (slash character "/" or "¥") and located in a middle of the file pathname 708. The pseudo-address generator 402 randomly generates a predetermined number of alphabetical characters 710 ("wxyz") in response to the portion 709 by using a predetermined alphabetical character generator that randomly generates an alphabetical character. A process of comparing and determining the predetermined number of generated alphabetical characters and a predetermined number of alphabetical characters included in the portion is similar to the above. In this way, the pseudo-address generator 402 may generate a file pathname 711 of a pseudo-address.

Figure 8A:
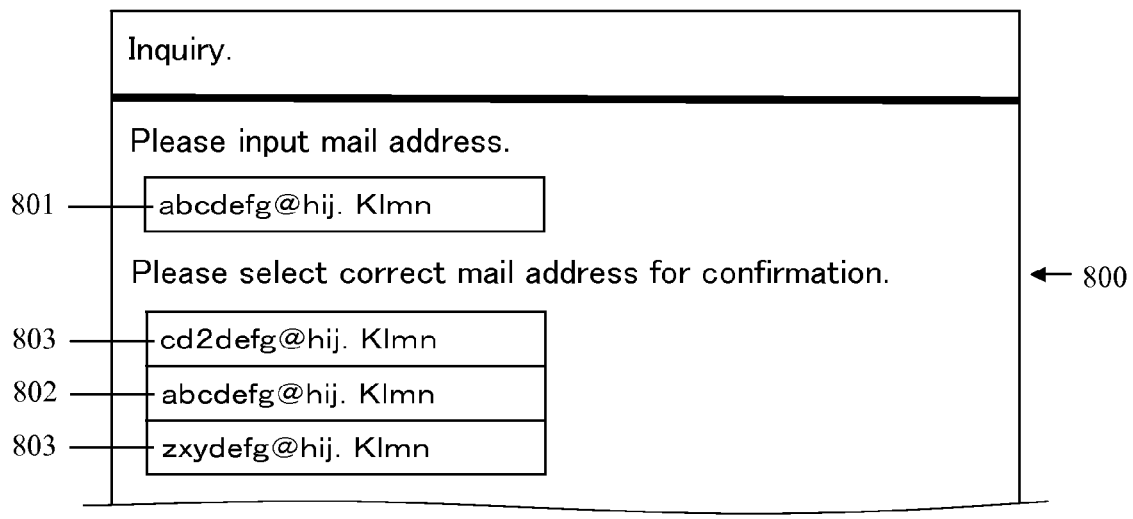
FIG. 8A is a diagram illustrating an example of an inquiry window of an operation unit according to the embodiment of the disclosure.

When the address is an e-mail address, for example, as illustrated in FIG. 8A, an operation unit (user interface unit) provided in a PC displays a predetermined window 800 (for example, a predetermined inquiry window) on a desktop to receive an input of an address from a user. In this case, as illustrated in FIG. 8A, when an e-mail address 801 of a first address is input, the pseudo-address generator 402 generates a predetermined number of e-mail addresses of a pseudo-address, and the pseudo-address display unit 404 displays a key 802 of the e-mail address of the first address and a key 803 of the e-mail address of the pseudo-address to be pressed.

When the address is an e-mail address, the disclosure is not limited to the operation unit of the PC, and the operation unit 102 of the multifunction peripheral 100 may be used.

Figure 8B:
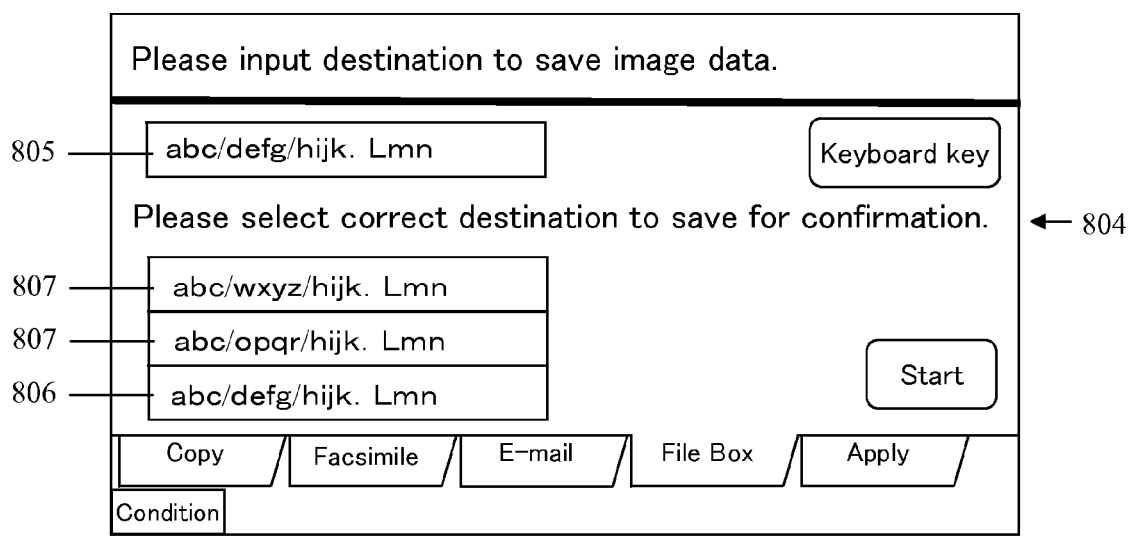
FIG. 8B is a diagram illustrating an example of a file box window of an operation unit according to the embodiment of the disclosure.

Further, when the address is a file pathname, for example, as illustrated in FIG. 8B, the operation unit 102 of the multifunction peripheral 100 displays a predetermined window 804 (for example, a file box window) on the touch panel 201 to receive an input of an address from a user. In this case, as illustrated in FIG. 8B, when a file pathname 805 of a first address is input, the pseudo-address generator 402 generates a predetermined number file pathnames of a pseudo-address. The pseudo-address display unit 404 displays a key 806 of the file pathname of the first address and a key 807 of the file pathname of the pseudo-address to be pressed. When the address is a file pathname, the disclosure is not limited to the operation unit 102 of the multifunction peripheral 100, and the operation unit of the PC may be used.

Further, in the embodiment of the disclosure, the pseudo-address generator 402 generates the pseudo-address 608 by converting the character 606 (digit) included in the portion which is a conversion target to the randomly generated character 607 (digit). However, another configuration may be used. For example, the pseudo-address generator 402 may be configured to generate the pseudo-address by converting the character included in the portion which is a conversion target to a character of the first address which is different from the portion or a character randomly selected from characters of the portion. Specifically, when the facsimile number of the first address is "0123456789", and the portion is "89", a converted character (a character after conversion) is two digits (for example, "01" and the like) randomly selected from "01234567" in a case of a digit randomly selected from digits of the facsimile number of the first address which is different from the portion, and is two digits (for example, "88" and the like) randomly selected from "89" in a case of a digit randomly selected from characters of the portion. When the corresponding configuration is employed, a generated facsimile number of a pseudo-address is further confused with the facsimile number of the first address, and thus it is possible to cause a user to perform an attentive examination. The disclosure is similarly applied to another address.

Further, in the embodiment of the disclosure, the pseudo-address generator 402 is configured to determine, as a portion, the last two digits 606 among ten digits included in the facsimile number 605 of the first address. However, another configuration may be used. For example, in the pseudo-address generator 402, the number of characters included in the portion which is a conversion target may be half the number of characters included in the first address or less. For example, in a case where the address is a facsimile number, a determined character may be the last one digit or the last three digits. Further, in a case where the address is an e-mail address, an alphameric character at any position, for example, a predetermined number of (a predetermined number in a range from three to ten, and the like) alphameric characters from the first alphameric character may be determined as the portion when the alphameric character is located prior to a specific character (at mark "@"). Further, in a case where the address is a file pathname, an alphabetical character at any position may be used when the alphabetical character is separated by specific characters (slash character "/" or "¥"). For example, when the file pathname is "abc/defg/hijk/lmn/opqr", alphabetical characters among "abc", "defg", "hijk", "lmn", and "opqr" may be determined as the portion. A scheme of determining the portion may be appropriately changed, which is similarly applied to the FTP.

Further, in the embodiment of the disclosure, the character may include a character of another country such as a Chinese character and Hangul in addition to a digit, an alphameric character, and an alphabetical character.

Further, in the embodiment of the disclosure, the address may include an address related to an electronic information member in addition to a facsimile number, a phone number, an e-mail address, a file pathname, and a pathname of an FTP.

Further, the operation unit 102 according to the embodiment of the disclosure is applied to a process of a facsimile transmitting function of the multifunction peripheral 100. However, the disclosure is not limited thereto. For example, the disclosure may be applied to a copy function, a facsimile receiving function, an e-mail transmitting and receiving function, a scanner function, a file box function, a print function, and the like. Furthermore, in the embodiment of the disclosure, a case of applying the operation unit 102 to the multifunction peripheral 100 is described. However, the disclosure is not limited thereto. The disclosure may be applied to various types of image forming apparatuses, various types of image treating apparatuses, various type of image processing apparatuses, various types of image display apparatuses, and the like including the operation unit 102 (operation device) that may display a window. In this case, the same effect may be obtained by regarding the operation unit 102 as a user interface unit of a terminal device such as a personal computer.

Further, in the embodiment of the disclosure, the operation unit 102 includes each unit. However, the disclosure is not limited thereto. A configuration of storing a program that implements each unit in a storage medium, and providing the storage medium may be used. In the configuration, the program is read by the operation unit 102 or the multifunction peripheral 100, and the operation unit 102 or the multifunction peripheral 100 implements each unit. In this case, the program read from the storage medium has the effect of the disclosure. Furthermore, it may be provided as a method of storing a step performed by each unit in a hard disk.

What is claimed is:

1. An operation device which receives an input of an address twice in a row from a user, and determines the input of the address when a second address is identical to a first address, the operation device comprising:
    a pseudo-address generator that generates a pseudo-address obtained by converting a portion of characters included in the first address to predetermined characters when the first address is input;
    a pseudo-address display unit that displays a key of the first address and a key of the pseudo-address to be pressed by the user; and
    an address determining unit that sets a predetermined address of a pressed key to a second address when the key of the predetermined address is pressed, and determines whether the second address is identical to the first address.

2. The operation device according to claim 1, wherein the pseudo-address generator generates the pseudo-address by converting a character included in the portion which is a conversion target to a randomly generated character.

3. The operation device according to claim 1, wherein the pseudo-address generator generates the pseudo-address by converting a character included in the portion which is a conversion target to a character of the first address different from the portion or a character randomly selected from the portion.

4. The operation device according to claim 1, wherein the pseudo-address generator compares a character included in the portion which is a conversion target with a predetermined character when generating the pseudo-address, and converts the character included in the portion to the predetermined character when the character included in the portion is not identical to the predetermined character.

5. The operation device according to claim 1, wherein the number of characters included in the portion which is a conversion target is half the number of characters included in the first address or less.

6. The operation device according to claim 1, wherein the address determining unit notifies the user that a new first address is to be input again when the second address is not identical to the first address.

7. An image forming apparatus comprising the operation device according to claim 1.

8. An operation method of an operation device which receives an input of an address twice in a row from a user, and determining the input of the address when a second address is identical to a first address, the operation method comprising:
    generating a pseudo-address obtained by converting a portion of characters included in the first address to predetermined characters when the first address is input;
    displaying a key of the first address and a key of the pseudo-address to be pressed by the user; and
    setting a predetermined address of a pressed key to a second address when the key of the predetermined address is pressed, and determining whether the second address is identical to the first address.

9. A non-transitory computer readable storage medium storing a program for causing a computer to execute the operation method according to claim 8.

* * * * *